United States Patent
Gibbs et al.

(10) Patent No.: US 9,759,032 B2
(45) Date of Patent: Sep. 12, 2017

(54) BLOWOUT PREVENTER END CONNECTION

(71) Applicant: Cameron International Corporation, Houston, TX (US)

(72) Inventors: Charles Gibbs, Stafford, TX (US); Steven F. Shimonek, League City, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/690,264

(22) Filed: Apr. 17, 2015

(65) Prior Publication Data

US 2016/0305211 A1    Oct. 20, 2016

(51) Int. Cl.
*E21B 33/06* (2006.01)
*F16K 51/00* (2006.01)

(52) U.S. Cl.
CPC ........... *E21B 33/062* (2013.01); *E21B 33/06* (2013.01); *F16K 51/00* (2013.01)

(58) Field of Classification Search
CPC ...... E21B 33/062; E21B 33/06; E21B 33/061; E21B 33/063; F16K 51/00
USPC .......... 251/1.1, 1.2, 1.3; 166/85.4, 363, 364
See application file for complete search history.

(56) References Cited

U.S. PATENT DOCUMENTS

| | | | | |
|---|---|---|---|---|
| 2,752,119 A | * | 6/1956 | Allen | E21B 33/062 137/327 |
| 2,912,214 A | * | 11/1959 | Allen | E21B 33/062 251/1.3 |
| 4,043,389 A | * | 8/1977 | Cobb | E21B 33/063 166/55 |
| 5,743,332 A | | 4/1998 | Lam et al. | |
| 7,216,715 B2 | * | 5/2007 | Reynolds | E21B 33/035 166/339 |
| 8,720,564 B2 | * | 5/2014 | Springett | E21B 33/063 166/297 |
| 2003/0085040 A1 | | 5/2003 | Hemphill et al. | |
| 2014/0021381 A1 | | 1/2014 | Jurena et al. | |
| 2014/0034293 A1 | * | 2/2014 | Jahnke | E21B 33/062 166/86.3 |
| 2015/0053418 A1 | | 2/2015 | Cote et al. | |

FOREIGN PATENT DOCUMENTS

WO    2006003469    1/2006

OTHER PUBLICATIONS

International Search Report and Written Opinion of PCT Application No. PCT/US2016/025358 dated Jun. 29, 2016: pp. 1-13.

* cited by examiner

*Primary Examiner* — Craig Schneider
*Assistant Examiner* — Andrew J Rost
(74) *Attorney, Agent, or Firm* — Chamberlain Hrdlicka

(57) ABSTRACT

An apparatus includes a blowout preventer housing including a bore extending therethrough and a cavity intersecting the bore. The apparatus further includes grooves in the outer profile of the blowout preventer housing, the grooves being on opposite sides of the cavity.

15 Claims, 8 Drawing Sheets

BLOWOUT PREVENTER END CONNECTION

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

More particularly, wellhead assemblies often include a blowout preventer, such as a ram-type blowout preventer that uses one or more pairs of opposing rams that press against one another to restrict flow of fluid through the blowout preventer. Typical blowout preventers are used as a large specialized valve or similar mechanical device that seal, control, and monitor oil and gas wells. The two categories of blowout preventers that are most prevalent are ram blowout preventers and annular blowout preventers. Multiple blowout preventers are frequently assembled in a stack. The stack typically includes both types of blowout preventers, usually with at least one annular blowout preventer stacked above several ram blowout preventers. The ram units in ram blowout preventers allow for both the shearing of the drill pipe and the sealing of the blowout preventer. The annular blowout preventer seals around the drill pipe thereby sealing the annulus surrounding the drill pipe. A blowout preventer or blowout preventer stack may be secured to a wellhead directly or indirectly, and may provide a safe means for sealing the well in the event the primary pressure control system has been compromised.

Blowout preventers are typically coupled with other components, in a stack or otherwise, by bolted upper and lower end connections. The lower end connection of the blowout preventer is typically a flange connection which is bolted to an upper end of the component directly below. The upper end connection of the blowout preventer is typically a non-flange connection which is bolted to a lower end of the component directly above. The upper end connection of the blowout preventer comprises one or more ram cavities which intersect a longitudinal bore of the blowout preventer.

One or more fasteners on the upper end connection of the blowout preventer are located over the ram cavities. Other bolts are not located over the ram cavities. The bolts over the ram cavities can move up or down when under load because of the elastic deflection of the body above the ram cavities. The other bolts cannot move up or down as much. As a result, the bolts over the ram cavities experience lower stresses than the bolts not over the ram cavities, i.e., loading on the upper end connection bolts is uneven. Accordingly, a blowout preventer end connection providing for more even loading is desirable.

BRIEF DESCRIPTION OF THE DRAWINGS

For a detailed description of the preferred embodiments of the present disclosure, reference will now be made to the accompanying drawings in which.

DETAILED DESCRIPTION

Figure 1:
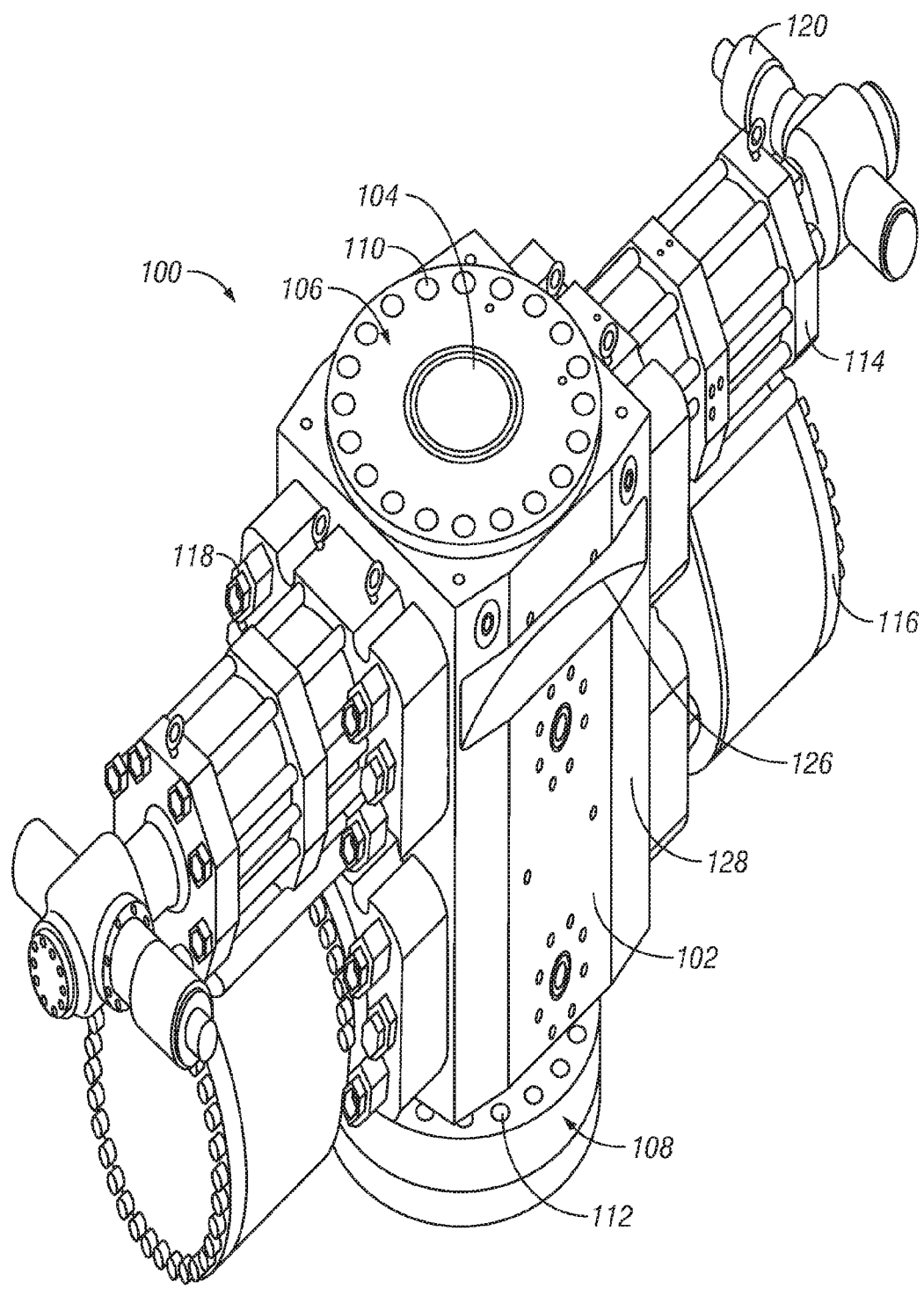
FIG. 1 shows an isometric view of a blowout preventer according to one or more embodiments.

The following discussion is directed to various embodiments of the present disclosure. The figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Turning now to the present figures, an isometric view of a blowout preventer 100 is illustrated in FIG. 1, by way of example. The depicted blowout preventer 100 includes a generally hollow main housing or body 102 and a bore 104 that enables passage of fluid and/or tubular members through the blowout preventer 100. As will be appreciated, the blowout preventer 100 may be coupled at its upper end connection 106 and flanged lower end connection 108 to other equipment that facilitate natural resource production.

For instance, production equipment or other components, such as another blowout preventer or mandrel, may be coupled to the upper end connection 106 of the blowout preventer 100 via fasteners (e.g., provided in the form of studs/bolts and nuts). The fasteners are extendable through any or all of the orifices 110 located on the upper end connection 106. The flanged lower end connection 108 of blowout preventer 100 may be coupled to another blowout preventer, a wellhead, or other components via additional fasteners. The fasteners are extendable through any or all of the orifices 112 located on the lower end connection 108. As an alternative, the lower end may comprise a wellhead connector that couples the BOP to another component.

Upper bonnet assembly 114 and lower bonnet assembly 116 are secured to body 102 and include various components that facilitate control of sealing and/or non-sealing rams disposed in the blowout preventer 100. The bonnet assemblies are shown coupled to the body 102 by way of fasteners 118 (e.g., studs/bolts and nuts in FIG. 1). Upper bonnet assembly 114 is shown including locking assemblies 120 which enable the sealing rams to be locked in a closed position. The bonnet assemblies 114, 116 each further include a piston and a ram, with a connecting rod connecting the piston and ram. These components are not shown but are well known in the art.

In operation, a force (e.g., from hydraulic pressure) may be applied to the pistons to drive the rams into the bore 104 of the blowout preventer 100. Upon actuation, the rams seal the bore 104 and inhibit flow through the blowout preventer 100. When these rams are moved into the closed position to seal the bore 104, the locking assemblies 120 can be used to lock the pistons in place. This allows the hydraulic pressure acting on the pistons to be reduced while still maintaining the rams in the closed position, and thereby sealing the bore 104.

Figure 2:
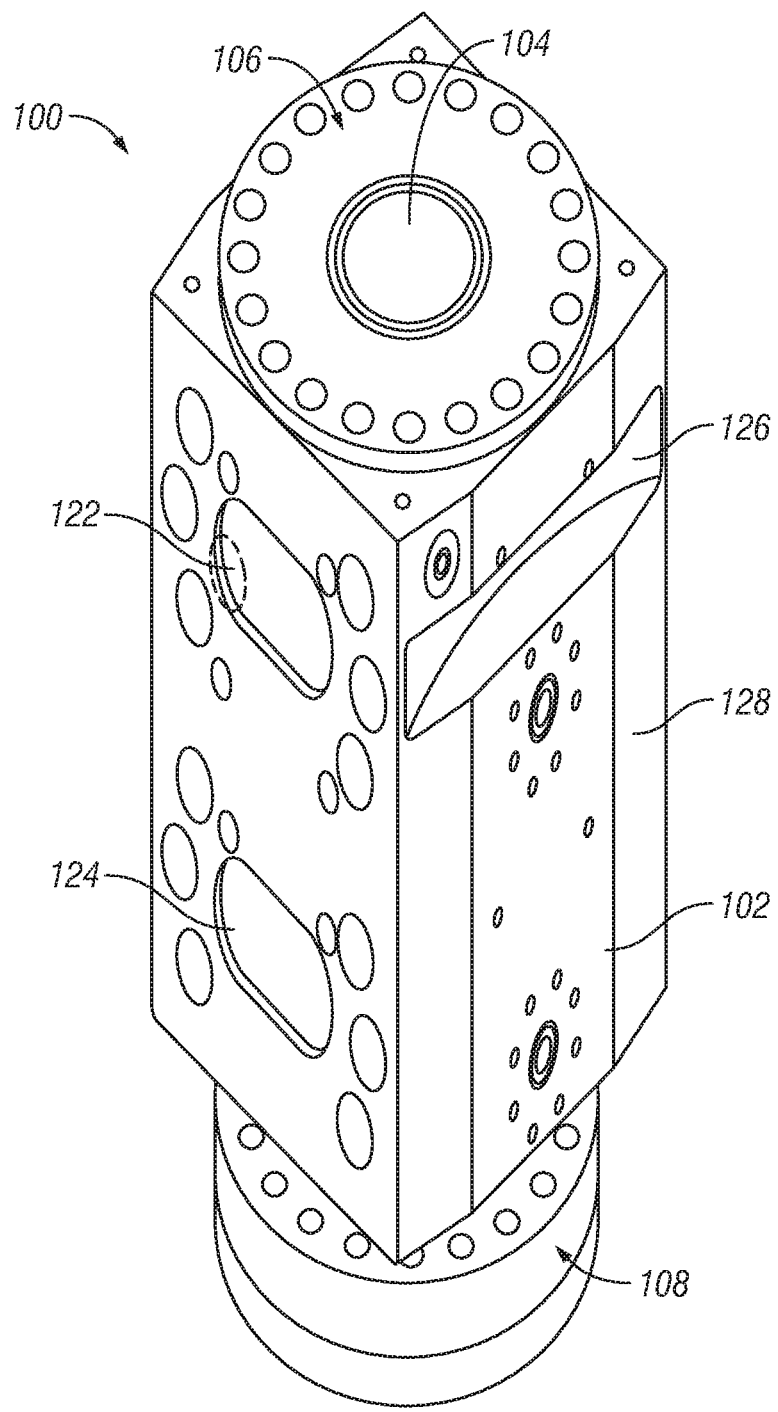
FIG. 2 shows an isometric view of a blowout preventer housing with two ram cavities.

Turning now to FIG. 2, another isometric view of the blowout preventer 100 of FIG. 1 is illustrated with bonnet assemblies 114, 116 removed, by way of example. In this view, upper ram cavity 122 and lower ram cavity 124 are in view. Upper ram cavity 122 and lower ram cavity 124 extend into the generally hollow body 102 and intersect with the longitudinal bore 104 of the body 102. By comparison with FIG. 1, bonnet assemblies 114, 116 are coupled to the body 102 at the upper and lower ram cavities 122, 124. Accordingly, the connecting rods and rams are extendable through the ram cavities 122, 124 into the longitudinal bore 104 of the body 102, thereby inhibiting flow through the blowout preventer 100.

In each of FIGS. 1 and 2, a groove 126 is shown extending into an outer profile 128 of the generally hollow body 102. The groove 126 is shown below the upper end connection 106 of the blowout preventer 100 with a rectangular elevational profile. However, other geometries and dimensions are envisioned. Another groove can be located below the upper end connection 106 of the blowout preventer 100 on the other side of the upper ram cavity 122. For example, the grooves 126 may be in the outer profile 128 of the blowout preventer housing 102, the grooves being on opposite sides of the cavity 122. The other groove can have the same or different geometry and dimensions of groove 126. One design consideration for the geometry of the groove 126 is the location of other elements located on or within the blowout preventer 100. For example, a typical blowout preventer contains porting which provides for signal communication (e.g., hydraulic, electrical, etc.) located on and/or within the body of the blowout preventer. The location and type of porting is not shown in the illustrated embodiments as this is commonly known in the art. The groove 126 can extend into the blowout preventer 100 body 102 but should not intersect any porting therewithin. As another example, fasteners 118 which connect the bonnet assemblies 114, 116 to the body 102 extend into the body 102 of the blowout preventer 100. The groove 126 can extend into the blowout body 102 but should not intersect any fasteners 118.

Figure 3:
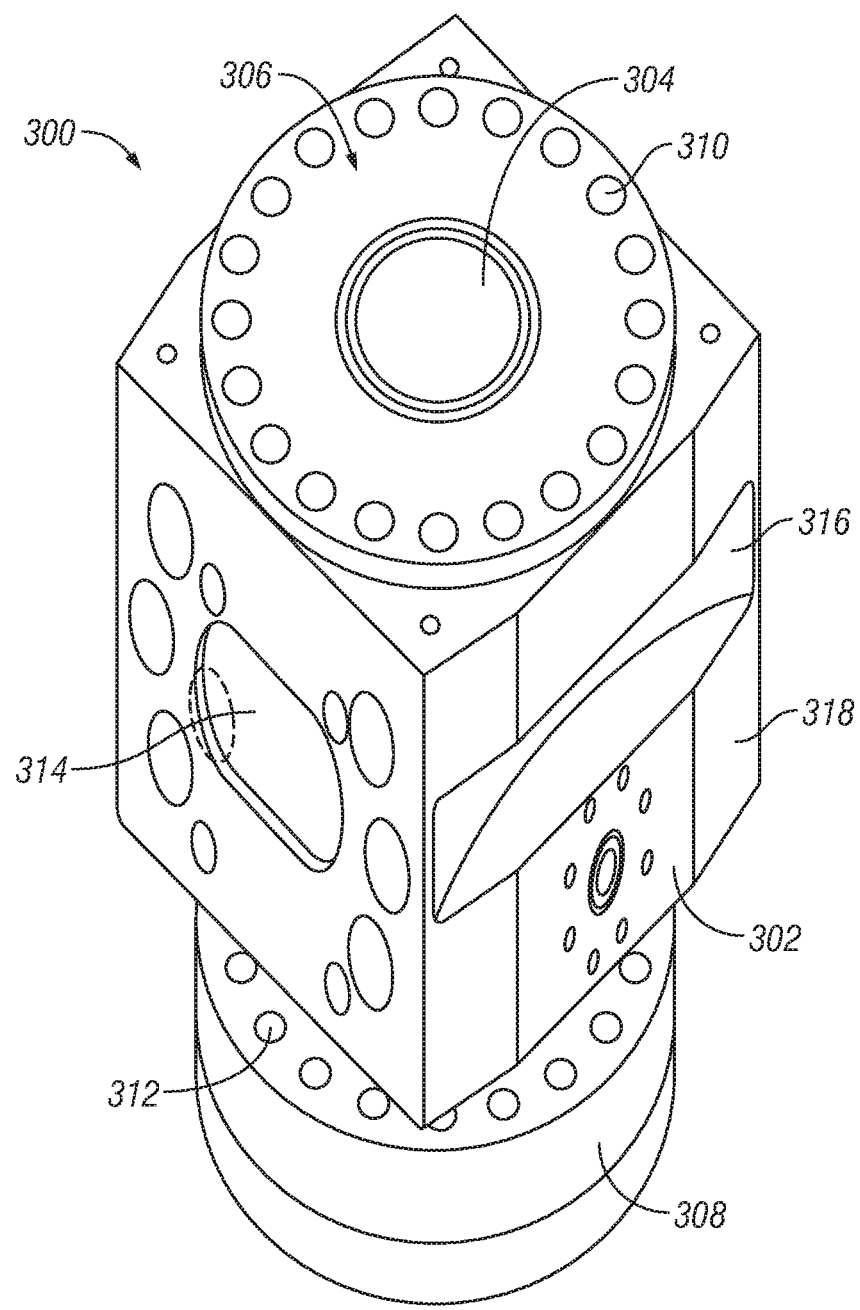
FIG. 3 shows an isometric view of a blowout preventer housing with a single ram cavity according to one or more embodiments of the disclosure.

The blowout preventer 100 illustrated in FIGS. 1 and 2 contains upper and lower ram cavities 122, 124, thereby providing for upper and lower bonnet assemblies 114, 116 and the corresponding pistons, connecting rods, and rams. Turning now to FIG. 3, an isometric view of a blowout preventer 300 is shown including a single ram cavity, by way of example. The depicted blowout preventer 300 includes a generally hollow main body 302 and a bore 304 that enables passage of fluid and/or tubular members through the blowout preventer 300. The blowout preventer 300 may be coupled at its upper end connection 306 and flanged lower end connection 308 to other equipment that facilitate natural resource production.

For instance, production equipment or other components may be coupled to the upper end connection 306 of the blowout preventer 300 via fasteners. The fasteners are extendable through any or all of the orifices 310 located on the upper end connection 306. The flanged lower end connection 308 of blowout preventer 300 may be coupled to other production equipment or components via additional fasteners. The fasteners are extendable through any or all of the orifices 312 located on the lower end connection 308.

Blowout preventer 300 includes a single ram cavity 314. Ram cavity 314 extends into the generally hollow body 302 and intersects with the longitudinal bore 304 of the body 302. A bonnet assembly, such as bonnet assemblies 114, 116 illustrated in FIG. 1, may be coupled to the body 302. Accordingly, the corresponding rams are extendable through the ram cavity 314 into the longitudinal bore 304 of the body 302, thereby inhibiting flow through the blowout preventer 300.

A groove 316 is shown extending into an outer profile 318 of the generally hollow body 302. The groove 316 is shown below the upper end connection 306 of the blowout preventer 300 with a rectangular elevational profile. However, like groove 126 illustrated in FIGS. 1 and 2, other geometries and dimensions are envisioned and design considerations for the geometry of the groove 316 are the location of other elements located on or within the blowout preventer 300. Further, another groove can be located below the upper end connection 306 of the blowout preventer 300 on the other side of ram cavity 314. For example, the grooves 316 may be in the outer profile 318 of the blowout preventer housing 302, the grooves being on opposite sides of the cavity 314. The other groove can have the same or different geometry and dimensions of groove 316. Moreover, the principles of this invention can be extended to BOP housings with three or more ram cavities.

Figure 4:
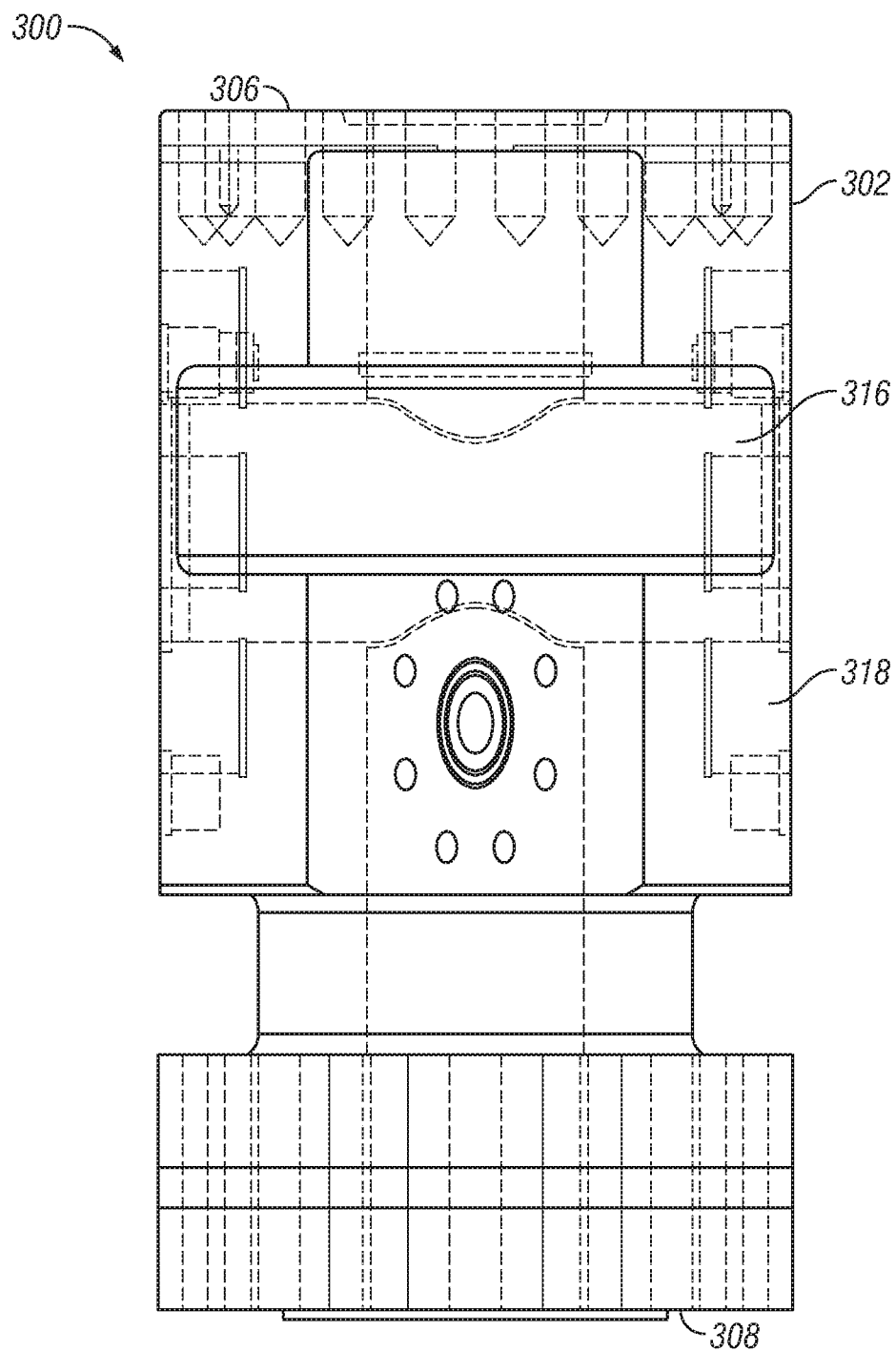
FIG. 4 shows a side elevation view of the blowout preventer of FIG. 3.
Figure 5:
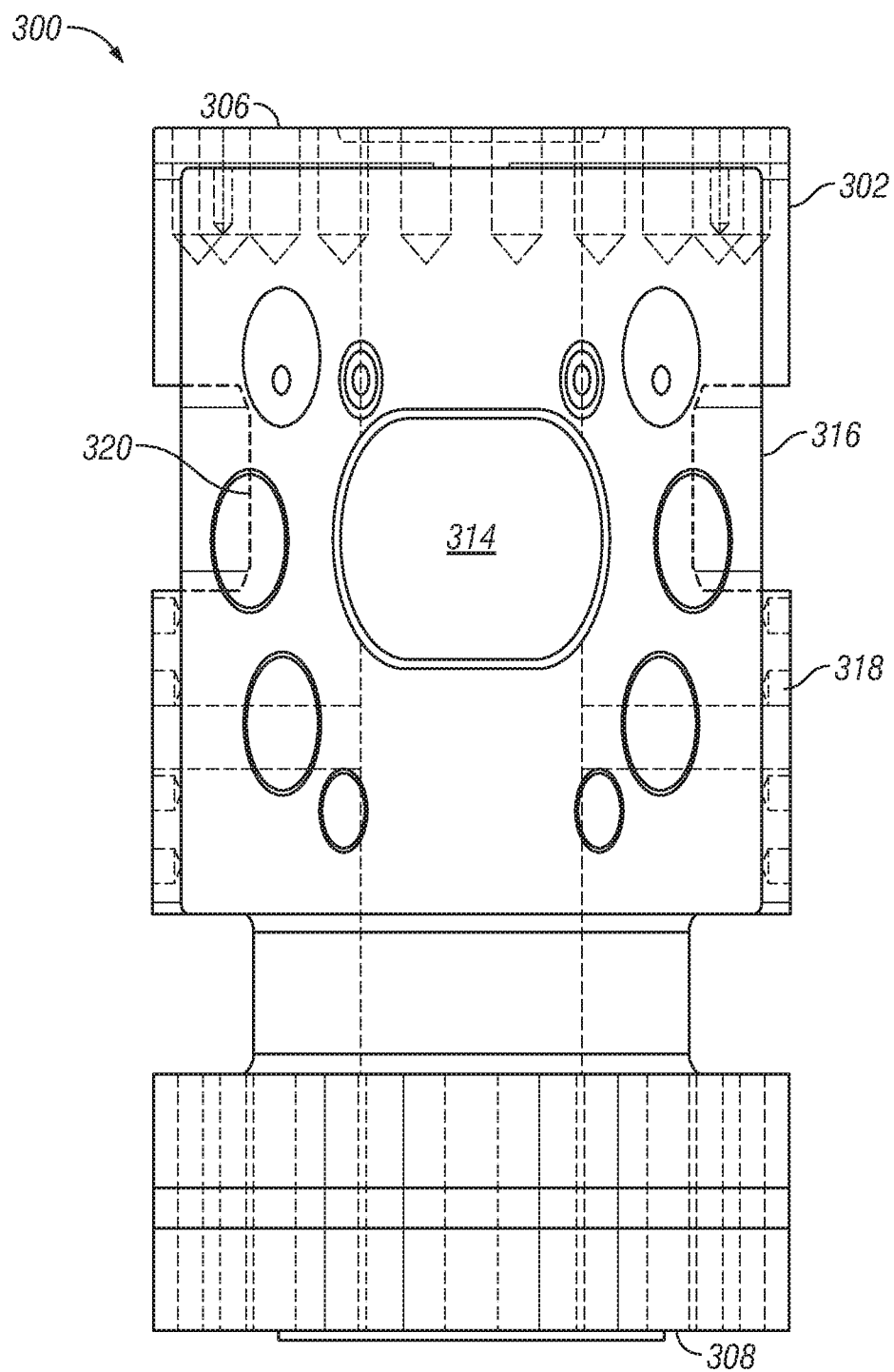
FIG. 5 shows another side elevation view of the blowout preventer of FIG. 3.

Turning now to FIGS. 4 and 5, side elevational views of blowout preventer 300 are shown, by way of example. FIG. 4 illustrates a side elevation view of the blowout preventer 300 facing the groove 316. The blowout preventer 300 includes upper end connection 306 and flanged lower end connection 308. Groove 316 is shown with a rectangular elevational profile and extends across the face of outer profile 318, below upper end connection 306. As illustrated, groove 316 does not extend to the edges of outer profile 318. However, as discussed above, different geometries and dimensions are envisioned provided the groove does not intersect any other components on and/or within the body 302 of the blowout preventer 300.

FIG. 5 illustrates another side elevation view of the blowout preventer 300 facing the ram cavity 314. As illustrated, ram cavity 314 extends through the generally hollow body 302 of the blowout preventer 300, intersecting the longitudinal bore 304 of the blowout preventer 300. In operation, a bonnet assembly, such as bonnet assemblies 114 and 116 illustrated in FIG. 1, could be coupled to the blowout preventer 300 so that corresponding rams are extendable through the ram cavity 314 into the longitudinal bore 304 of the body 302, thereby inhibiting flow through the blowout preventer 300.

Groove 316 is shown extending into the generally hollow body 302. The profile of groove 316 in this embodiment is illustrated by dashed lines 320. The groove 316 does not intersect any other components on and/or within the body 302 of the blowout preventer 300.

Figure 6:
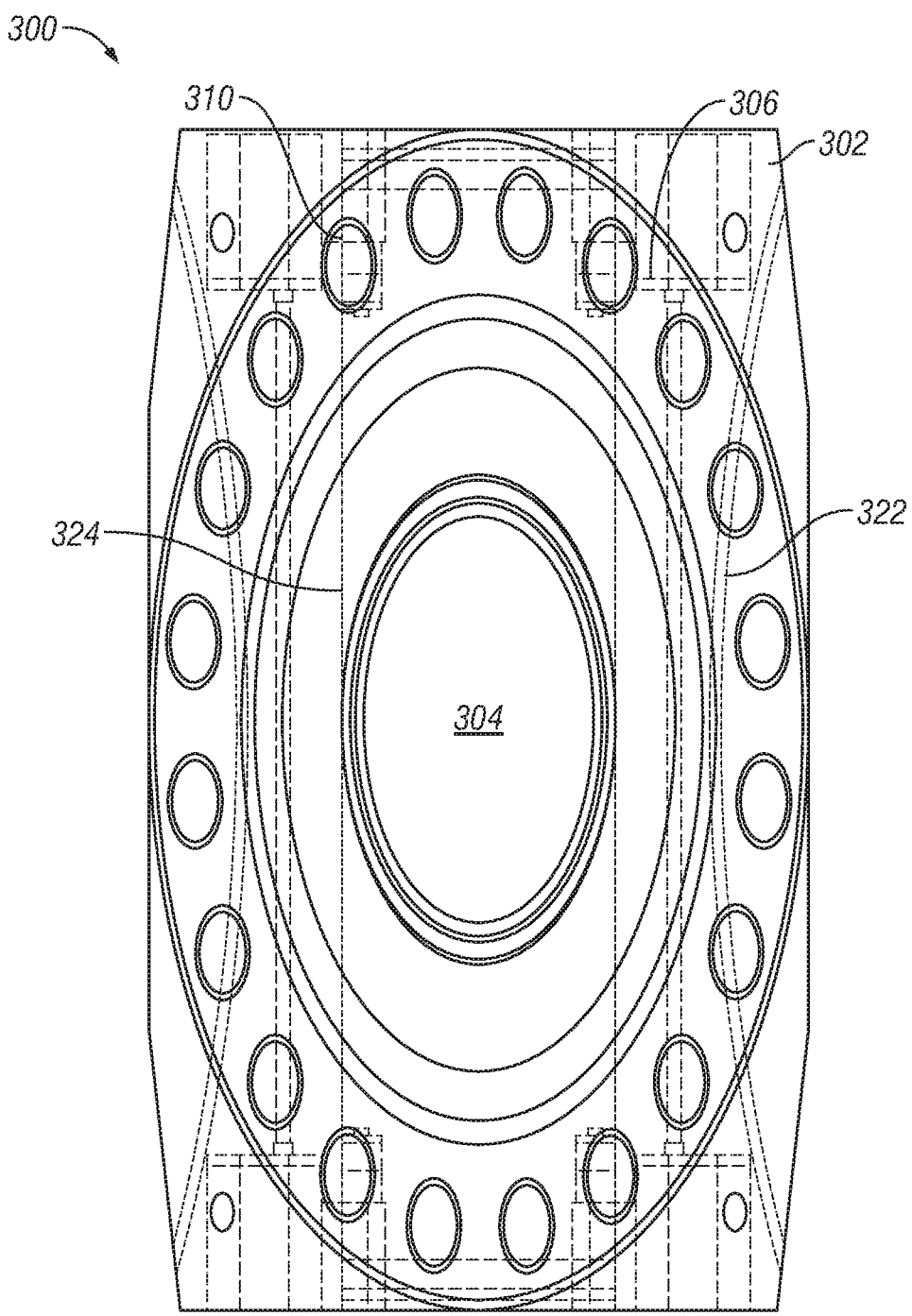
FIG. 6 shows a top view of the blowout preventer of FIG. 3.

Turning now to FIG. 6, a top view of the blowout preventer 300 is shown, by way of example. FIG. 6 illustrates the upper end connection 306 of blowout preventer 300, including the fastener orifices 310. As illustrated, fastener orifices 310 are distributed circumferentially about upper end connection 306. Fasteners (e.g., provided in the form of studs/bolts and nuts) are extendable through any and/or all of the fastener orifices 310. Another component with a corresponding connection (e.g., a connection with aligning fastener orifices) can be coupled to the upper end connection. In this way, a stack of equipment, such as a blowout preventer stack, may be assembled. The profile of groove 316 is indicated by dashed lines 322. The groove 316 does not intersect any other components on and/or within the body 302 of the blowout preventer 300.

Further, the ram cavity 314 profile is indicated by dashed lines 324. As illustrated, ram cavity 314 extends across the blowout preventer 300 generally hollow body 302 and intersects the longitudinal axis 304 of the blowout preventer 300. In operation, a bonnet assembly, such as bonnet assemblies 114 and 116 illustrated in FIG. 1, could be coupled to the blowout preventer 300 so that corresponding rams are extendable through the ram cavity 314 into the longitudinal bore 304 of the body 302, thereby inhibiting flow through the blowout preventer 300.

Figure 7:
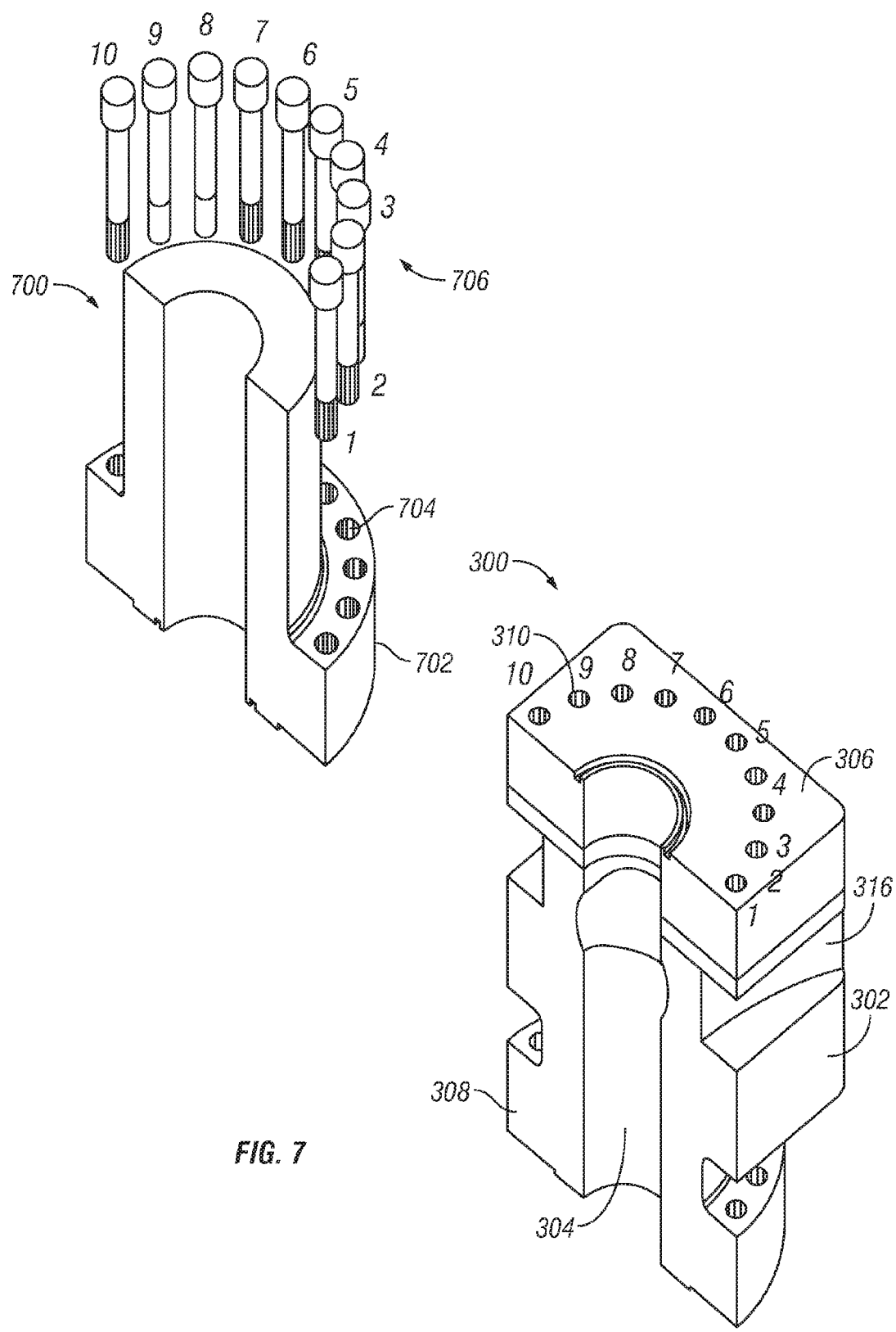
FIG. 7 shows cross-sectional isometric view of the blowout preventer of FIG. 3.

Turning now to FIG. 7, a cross-sectional isometric view of blowout preventer 300 is shown, by way of example. FIG. 7 further includes another component 700 which is capable of mating with the upper end connection 306 of the blowout preventer 300. Component 700 can be production equipment or other components, such as another blowout preventer, a connector mandrel allowing for connection to a lower marine riser package, or the like.

Corresponding component 700 includes a flanged lower end connection 702 including a number of fastener orifices 704. In the illustrated cross-sectional isometric view, the flanged lower end connection 702 includes ten fastener orifices, which correspond to fasteners 706 labeled "1" through "10." Although the illustrated embodiment shows ten fasteners in the cross-sectional view, any number of fasteners may be used. The fasteners are extendable through orifices 704 of component 700 and orifices 310 of blowout preventer 300. The blowout preventer 300 orifices 310 are also labeled "1" through "10," indicating which orifices 300 correspond to which fasteners 706. When component 700 is landed on the blowout preventer 300 and made up, the fasteners 706 each experience varying stresses when loads are applied.

Figure 8:
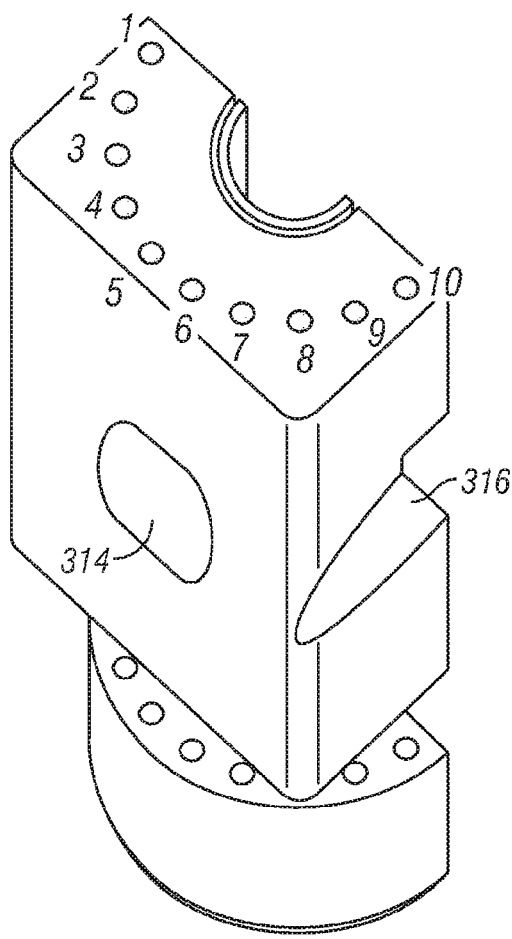
FIG. 8 shows a cross-sectional isometric view of a blowout preventer with grooves.
Figure 9:
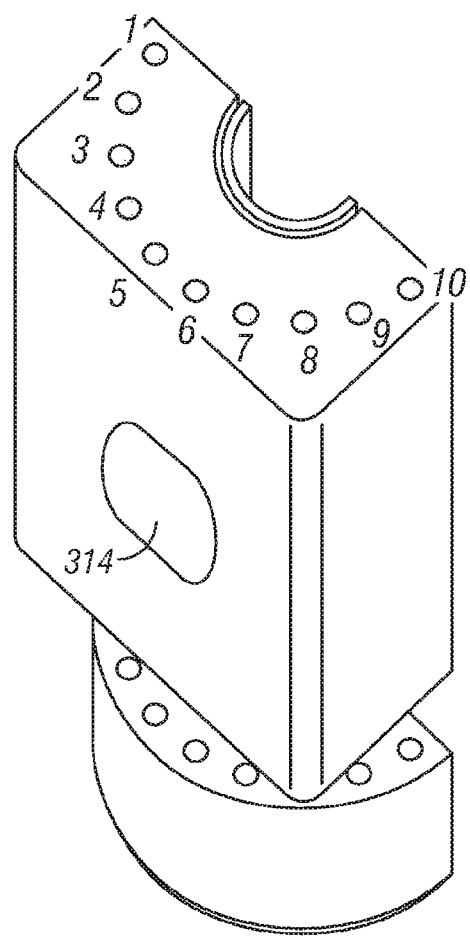
FIG. 9 shows a cross-sectional isometric view of a blowout preventer without grooves.

Turning now to FIGS. 8-9, the reverse isometric views of the BOP showing the ram cavity 314. FIG. 8 shows the reverse isometric view of the BOP including the groove 316. FIG. 9 shows the reverse isometric view of the BOP with groove 316 omitted. It can be seen in FIG. 9 that the fasteners in the orifices 4-7 would receive less support from the BOP body due to the missing material in the ram cavity 314. Because these fasteners receive less support, they are able to move more when loaded than the remaining fasteners in orifices 1-3 and 8-10. Therefore, fasteners 1-3 and 8-10 will experience higher stresses, as they are forced to carry more load as the BOP system experiences load.

This is owing to the fact that fasteners 4-7 are located over a ram cavity. Because fasteners 4-7 are located over the ram cavity, there is less solid metal underneath these fasteners allowing them to move more when loaded. This movement causes these fasteners to be stressed less than fasteners 1-3 and 8-10. Conversely, fasteners 1-3 and 8-10 are more highly stressed because these fasteners are located on the solid metal portion of the blowout preventer body. As a result, each fastener is carrying a load or stress that varies depending on the position of the fastener relative to the ram cavity. This disproportional loading of the fasteners causes a lower overall load rating for the BOP because the total load is limited by the most highly stressed fasteners.

In FIG. 8 where the blowout preventer includes a groove, the stresses experienced by fasteners 1 through 10 still vary from fastener to fastener depending on, among other things, the location of each fastener relative to the cavity. However, the discrepancy between the lowest and highest stresses experienced is significantly reduced. This is because the groove simulates, as close as possible, a flanged connection. That is, fasteners 1-3 and 8-10 are now located over the groove instead of solid metal. As a result, fasteners 1-3 and 8-10 are able to behave more like fasteners 4-7 which are located over the ram cavity. The radial grooves 316 allow the material above them containing orifices 1-3 and 8-10 to act more like the material above the ram cavity 314 containing orifices 4-7.

When the amount of disproportional loading experienced by the fasteners is reduced, the fasteners are allowed to carry a more evenly distributed portion of the overall load. Because of the lower loads, the maximum stress of the most highly stressed fasteners is decreased. Since the maximum stress of the most highly stressed fasteners is reduced, the BOP can therefore carry more load or have a higher load rating without increasing either the size of the BOP body or the fasteners.

As discussed above, FIGS. 1 and 2 illustrate a blowout preventer body with two ram cavities. FIGS. 3-7 illustrate a blowout preventer body with a single ram cavity. However, any blowout preventer body with an upper end connection as discussed herein, regardless of the number of ram cavities, can be manufactured or modified to include a groove to mitigate load distribution among its fasteners.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A blowout preventer housing, comprising:
    a longitudinal bore extending through the housing;
    a cavity intersecting the bore;
    grooves in a longitudinal outer-side profile of the blowout preventer housing and on opposite sides of the cavity and axially overlapping with the cavity with respect to an axis of the bore;
    an end connection configured to couple the housing with another component, the end connection comprising a plurality of fasteners for fastening the end connection to the another component with the fasteners distributed about the circumference of the end connection; and
    wherein the fasteners are located above the cavity and above the grooves such that the grooves are configured to balance stress across the fasteners.

2. The blowout preventer housing of claim 1, further comprising two or more cavities intersecting the bore.

3. The blowout preventer housing of claim 1, wherein the grooves are configured to mitigate uneven loading of the fasteners under load.

4. The blowout preventer housing of claim 1, wherein the grooves are configured to mitigate overall stress experienced by the fasteners under loading.

5. The blowout preventer housing of claim 1, wherein the grooves are locatable below the end connection.

6. The blowout preventer housing of claim 1, wherein the fasteners are bolts.

7. The blowout preventer housing of claim 1, further comprising a plurality of cavities.

8. The blowout preventer housing of claim 1, wherein the grooves comprise the same dimensions.

9. The blowout preventer housing of claim 1, wherein the blowout preventer housing is assembled in a stack comprising a plurality of blowout preventer housings.

10. The blowout preventer housing of claim 9, wherein each of the plurality of blowout preventer housings includes grooves.

11. The blowout preventer housing of claim 1, further comprising:
    a bonnet housing;
    a ram movably positioned within the cavity and at least partially movable into the bore of the blowout preventer housing;
    a rod configured to move the ram; and
    a piston movably positionable within the bonnet housing and configured to move the rod.

12. A blowout preventer comprising a housing comprising:
    a longitudinal outer-side profile;
    a longitudinal bore extending through the housing;
    a cavity intersecting the bore;
    grooves in the longitudinal outer-side profile of the blowout preventer housing and on opposite sides of the cavity and axially overlapping with the cavity with respect to an axis of the bore; and
    an end connection comprising a plurality of fasteners for fastening the end connection to another component with the fasteners distributed about the circumference of the end connection;
    wherein the fasteners are located above the cavity and above the grooves such that the grooves are configured to balance stress across the fasteners.

13. The blowout preventer of claim 12, wherein the grooves are configured to mitigate uneven loading of the fasteners under load.

14. The blowout preventer housing of claim 12, wherein the grooves are configured to mitigate overall stress experienced by the fasteners under loading.

15. The blowout preventer housing of claim 12, wherein the grooves extend across a face of the longitudinal outer-side profile of the housing.

* * * * *